United States Patent [19]

Peters

[11] Patent Number: 5,352,297
[45] Date of Patent: Oct. 4, 1994

[54] RAILROAD CAR SPRAYING METHOD AND APPARATUS

[76] Inventor: David E. Peters, 1971 E. Yellowstone, Casper, Wyo. 82601

[21] Appl. No.: 87,381

[22] Filed: Jul. 8, 1993

[51] Int. Cl.$^5$ ............................................. B08B 3/02
[52] U.S. Cl. ........................................ 134/15; 134/18; 134/57 R; 134/58 R; 134/181; 134/122 R; 404/76; 118/303; 239/559
[58] Field of Search ............... 134/56 R, 57 R, 58 R, 134/172, 181, 123, 45, 15, 18, 25.1, 122 R, 64 R; 118/303; 239/559, 560, 561; 404/76; 162/275, 276

[56] References Cited

U.S. PATENT DOCUMENTS

| | | | |
|---|---|---|---|
| 2,756,759 | 7/1956 | Swain | 134/123 |
| 3,072,130 | 1/1963 | Grabenhorst | 134/123 X |
| 3,581,335 | 6/1971 | Saxonmeyer | 134/123 |
| 3,689,318 | 9/1972 | Phillips | 134/123 X |
| 3,961,752 | 6/1976 | Doeksen | 134/181 |
| 4,169,170 | 9/1979 | Doeksen . | |
| 4,220,170 | 9/1980 | Herbert et al. . | |
| 4,351,478 | 9/1982 | Looper . | |
| 4,594,268 | 6/1986 | Kirwin . | |
| 4,642,176 | 2/1987 | Yan . | |
| 4,650,598 | 3/1987 | Roberts . | |
| 4,718,439 | 1/1988 | Gorra et al. | 134/123 X |
| 4,719,932 | 1/1988 | Burton . | |
| 4,778,615 | 10/1988 | Jeglic . | |
| 4,805,653 | 2/1989 | Krajicek et al. . | |
| 4,971,084 | 11/1990 | Smith et al. | 134/123 X |
| 4,988,042 | 1/1991 | Del Prato et al. . | |
| 5,076,304 | 12/1991 | Mathews . | |
| 5,192,337 | 3/1993 | Wajer et al. . | |

FOREIGN PATENT DOCUMENTS

| | | | |
|---|---|---|---|
| 1530289 | 10/1969 | Fed. Rep. of Germany | 134/123 |
| 717625 | 10/1954 | United Kingdom | 134/123 |
| 841966 | 7/1960 | United Kingdom | 134/123 |

*Primary Examiner*—Frankie L. Stinson
*Attorney, Agent, or Firm*—Richard C. Litman

[57] ABSTRACT

Spray apparatus for applying a fixative liquid chemical to freshly loaded railway coal cars includes a pivoting boom mounted atop a column. The column is both rotatable, to enable avoiding encroaching on a railway right of way, and vertically adjustable, to accommodate cars loaded to different heights. Boom pivot and column vertical movement are powered. Three rows of spray nozzles are supported from the boom. Each nozzle has its own valve. A first row of nozzles sprays the frontal, inclined surface of heaped coal. A second row sprays the main body of heaped coal, and a third row sprays the rearward, inclined surface. Photoresponsive sensors initiate spray signals, which are conditioned by timers. Progress of a railway car past these sensors initiates spray signals, which are suitably delayed, then discontinued, by timers. Total spray time for any one car is limited by an additional timer. Train speed is gauged by an observer, after which timing functions are determined to spray each car appropriately. A combination of boom pivoting and column vertical adjustment assures that the nozzles are centered over the railway car. The column comprises concentric members fitted at close tolerance to reduce cumulative play which would otherwise throw the nozzles off center. Method of use including a preferred sequence of operation is included.

14 Claims, 5 Drawing Sheets

RAILROAD CAR SPRAYING METHOD AND APPARATUS

BACKGROUND OF THE INVENTION

1. Field of the Invention

The present invention relates to an apparatus and method for dispensing a liquid onto a railroad car loaded with coal to prevent evaporation of liquids contained within the coal.

2. Description of the Prior Art

Dispensing of liquid onto moving vehicles is commonly performed for the purpose of washing the vehicle, and the prior art generally pertains to cleaning. Certain similarities are seen in prior art cleaning devices and the dispensing apparatus of the present invention.

U.S. Pat. No. 4,220,170, issued to Chris J. Hebert et al. on Sep. 2, 1980, discloses a boom arm apparatus for cleaning the interior of a large tank or the like. The apparatus adjusts axially and rotationally, and includes a plurality of spray heads located on an arm which is held perpendicular to the main boom arm. The Hebert device is manually repositioned along the tank or ship hull to which it is attached.

A washing apparatus including adjustable boom, photoelectric system, and fluid supply system is seen in U.S. Pat. No. 4,719,932, issued to Forrest R. Burton on Jan. 19, 1988.

A washing apparatus having the ability to detect position and contour of a vehicle, and to aim washing fluid accordingly, is seen in U.S. Pat. No. 4,988,042, issued to Daniel J. Del Prato et al. on Jan. 29, 1991.

Other washing devices having adjustable spray heads include U.S. Pat. Nos. 4,351,478, 4,805,653, and 5,076,304, issued respectively to Bruce T. Looper on Sep. 28, 1982; to Richard W. Krajicek et al. on Feb. 21, 1989; and to W. Harry Mathews on Dec. 31, 1991.

None of the above inventions and patents, taken either singly or in combination, is seen to describe the instant invention as claimed.

SUMMARY OF THE INVENTION

The present invention is directed to spraying railway cars freshly loaded with coal with chemicals in liquid form for encapsulating the load. Encapsulation extends to saturating the top six inches (fifteen cm) with sufficient liquid to prevent moisture from evaporating from the coal as the railway cars move along the railroad at traveling speeds. The nature and purpose residing herein differ from washing operations in ways that affect application of a liquid, and hence, the precise apparatus employed.

Washing involves removing dirt or other waste products, so that effluent from washing is expendable, or, at least, not immediately reusable. By contrast, treating coal requires dispensing sufficient liquid to penetrate a particulate mass to the depth specified above. Economic imperatives limit liquid application to just sufficient quantity to accomplish the objectives.

Treating coal must be accomplished prior to the coal supply train attaining traveling speed, and is typically performed in the open as the train leaves the mine area at low speed. The dispensing system must be able to function in any weather. In the coal mining regions of Wyoming, where much U.S. coal is located, ambient temperatures as low as $-60°$ F. ($-50°$ C.) are encountered.

Cars are not identically loaded, each car having a nearly unique pattern of heaped pulverized coal defined therein. The dispensing system must be able to adjust for varying loading patterns.

The dispensing system must respect a railroad right of way. For this reason, the vertical members must operate at a distance from the railroad cars, and a boom carrying the spray nozzles which lowers over the cars must also be able to pivot so as not to be above the right of way. The boom must be able to span the distance from its vertical support column, and still position itself precisely over the longitudinal center of the coal car.

When used, the dispensing system must sense the presence of passing coal cars, and dispense liquid accordingly. The nature of the liquid requires that the spray impinge upon the coal at an angle substantially normal to the coal heap surface. When a coal car first passes the dispensing system, the forward face of the coal heap is at an inclination with respect to a vertical direction. The trailing face is similarly inclined, albeit in the opposite direction. The novel dispensing system senses appropriate conditions, and causes the spray to conform to requirements.

To these ends, the dispensing system comprises a spray tower having a boom pivotally mounted atop a rotatable and axially extendable column. The boom supports a plurality of nozzles, each having its own valve, each valve operated by an individual pneumatic or electrical line. The nozzles are inclined advantageously, so as to be able to spray a leading, inclined face, a trailing, inclined face, and the central portion of the heaped coal.

Photoresponsive sensors sense position of a passing coal car with respect to the apparatus of the dispensing system. Detection of a coal car initiates spray operations. Spray operations are performed in three increments coordinated to treat the leading, inclined face of the heaped coal, the large, central portion of the heaped coal, and the trailing, inclined face of the heaped coal. The first increment is started at a point one foot in distance behind the front of the car, which distance is gauged by passage of the front of the car. The remaining incremental operations are then performed, each of the three incremental operations employing a separate, dedicated series of spray nozzles.

Duration and scheduling of spray are controlled by a combination of sensors and timers. Two photoresponsive sensors detect presence and position of a railway car with respect to the spray tower. An initiating signal for initiating spraying operations is generated by the photoresponsive sensors, and is conditioned by timers to produce appropriate control signals operating valves which regulate liquid flow through the spray nozzles.

Liquid supply and signal lines are extended from a control building underground to the spray tower. A separate conduit conducts these lines upwardly, terminating just below the boom, close to the vertical tower. This conduit, and individual liquid and signal lines where required, are insulated and traced with heating cable.

The speed of the coal train, typically 110 cars passing in one to one and one-half hours, is gauged by an observer, and the timers are set accordingly.

The spray tower includes manual and powered means to maneuver the same. Raising and lowering the vertical column are performed by a powered winch. Maximum permissible vertical travel is limited by limit switches. Pivot of the boom is facilitated by a manual winch. Rotation of the column, as for pivoting the boom away from the railway right of way, is enabled by grasping a projecting handle and manually rotating the column. The boom is balanced so that manual rotation of the column is readily performed.

Accordingly, it is a principal object of the invention to provide a spray apparatus for spraying all exposed surfaces of coal heaped in a railway car.

It is another object of the invention to provide a spray apparatus for limiting spraying of a railway coal car to exposed surfaces of the coal heaps, and avoiding overspray of the space between cars, thereby conserving the sprayed liquid.

It is a further object of the invention to provide a spray apparatus which is centered over the longitudinal axis of coal cars.

A still further object of the invention is to provide a spray apparatus which pivots away from a railway car to avoid encroachment of a railroad right of way and as a safety precaution.

Yet another object of the invention is to provide a spray apparatus which initiates and ceases spraying automatically.

Still another object of the invention is to control spraying time by limiting the same to a maximum interval for any one car.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
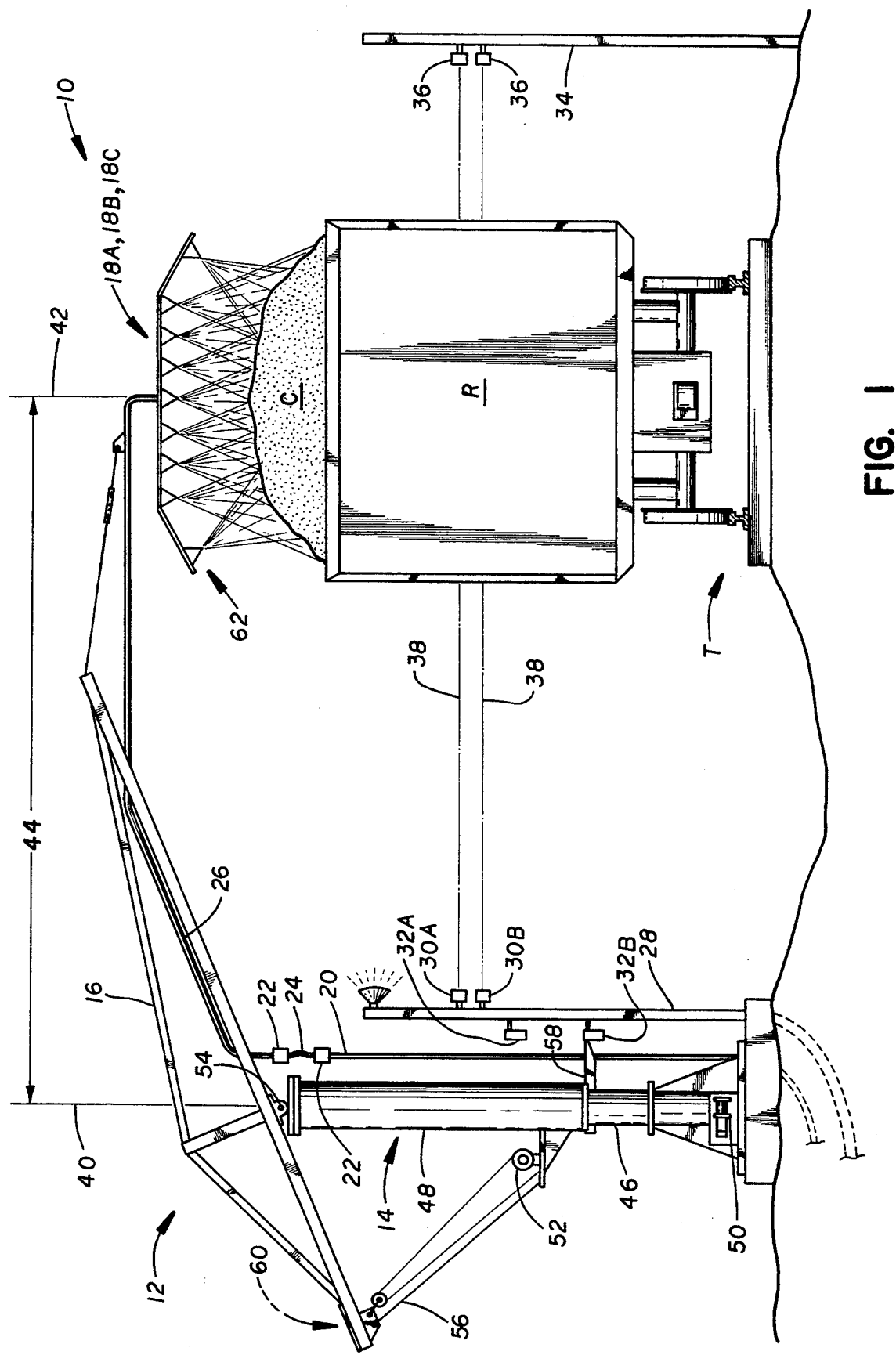
FIG. 1 is an environmental, partially diagrammatic, side elevational view of the novel spray apparatus.

Turning first to FIG. 1, the novel spray apparatus 10 is seen spraying heaped coal C in a railway coal car R. Spray tower 12 is seen to comprise vertical column 14, boom 16, and nozzle assemblies 18A, 18B, 18C. Supply and signal conduit 20 is located adjacent spray tower 12, and includes unions 22, 22 and flexible conduit 24. Individual liquid and signal conduits, collectively designated 26, are extended along boom 16 to nozzle assemblies 18A, 18B, 18C. Signal conduits may comprise electrical conductors, pneumatic conduits, or similar conduits for transmitting a signal from a central control station (not shown).

A signalling post 28 supports photoresponsive receptors 30A, 30B and upper and lower limit switches 32A, 32B. A corresponding signalling post 34 having photo-signal sending units 36, 36 is located on the other side of railway track T, so that a passing coal car R will break photosignal beams 38, 38.

Column axis 40 and railroad car center line 42 are seen to be separated by a radial distance 44. Distance 44 includes a railway right of way, in addition to radii of spray tower 12 and of coal car R.

Figure 2:
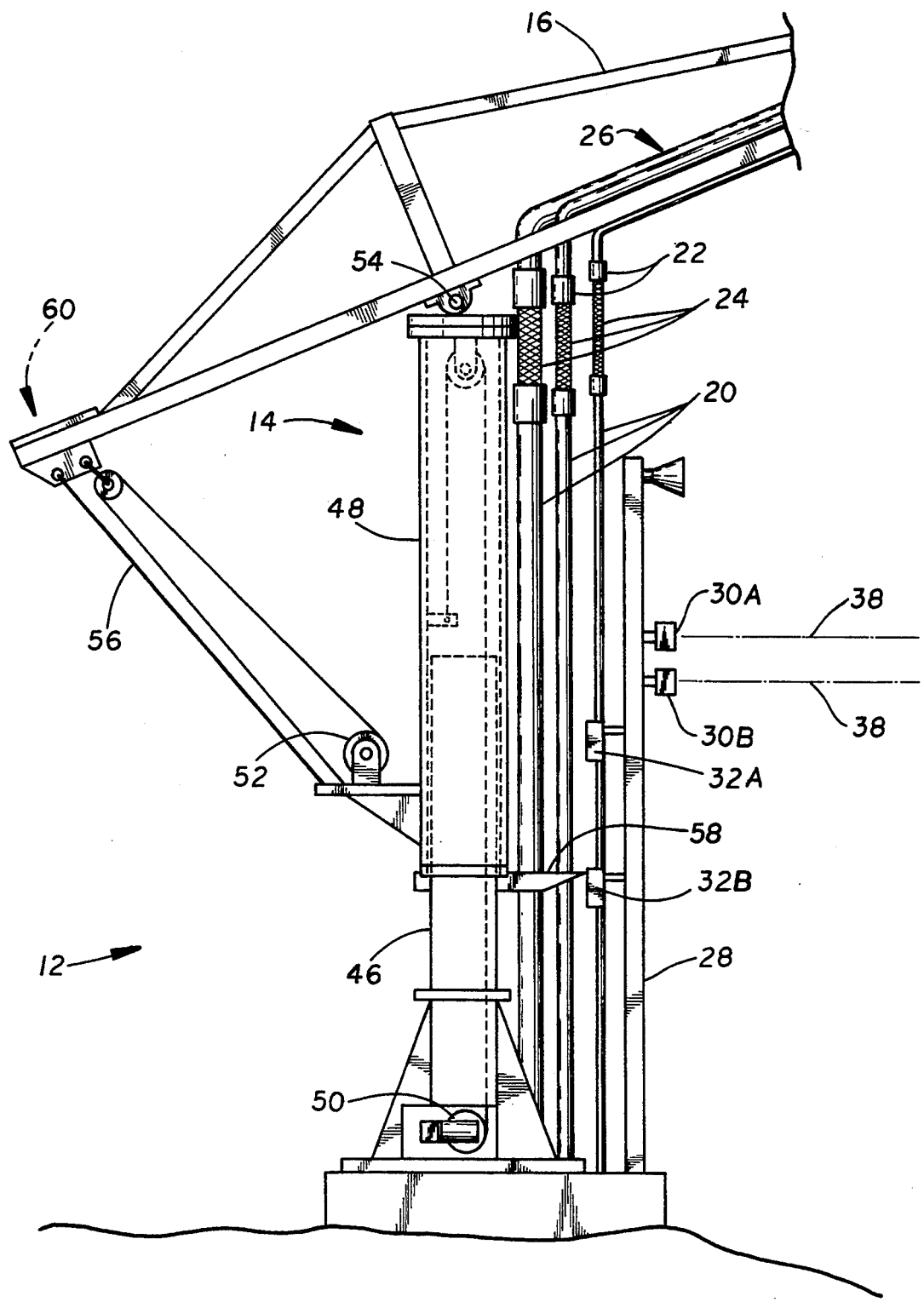
FIG. 2 is a side elevational, partially diagrammatic, detail view of the column of the spray apparatus.

Spray tower 12 is shown in greater detail in FIG. 2. Column 14 comprises inner and outer concentric members 46 and 48. Outer member 48 is rotatably disposed about inner member 46 at a very close tolerance not exceeding 0.40 inch (10.2 mm). This tolerance, which is preferably in the range of 0.010 inch to 0.018 inch (0.25 to 0.46 mm), reduces inaccuracy of location of nozzle assemblies 18 as they are centered over a railway car R. If not controlled by employing this tolerance, distance 44 would vary to the extent that, under certain wind conditions, spray would not coincide with coal car R. The ability to rotate also enables boom 16 to be pushed aside harmlessly should it interfere with a railway car R.

A power winch 50 raises and lowers column outer member 48, with concealed pulley components being diagrammatically represented in broken lines.

A manual winch 52 is used to raise and lower boom 16 as it pivots about pivot point 54. An auxiliary safety chain 56 prevents lowering of the spray end of boom 16 in the event of failure of winch 52, which would potentially allow nozzle assemblies 18 to become entangled with a railway car R.

A handle 58 enables an operator (not shown) to pivot column outer member 48 and boom 16 away from its operative position. The same handle 58 trips limit switches 32A and 32B in order to limit maximum permissible vertical movement of column outer member 48.

Figure 3:
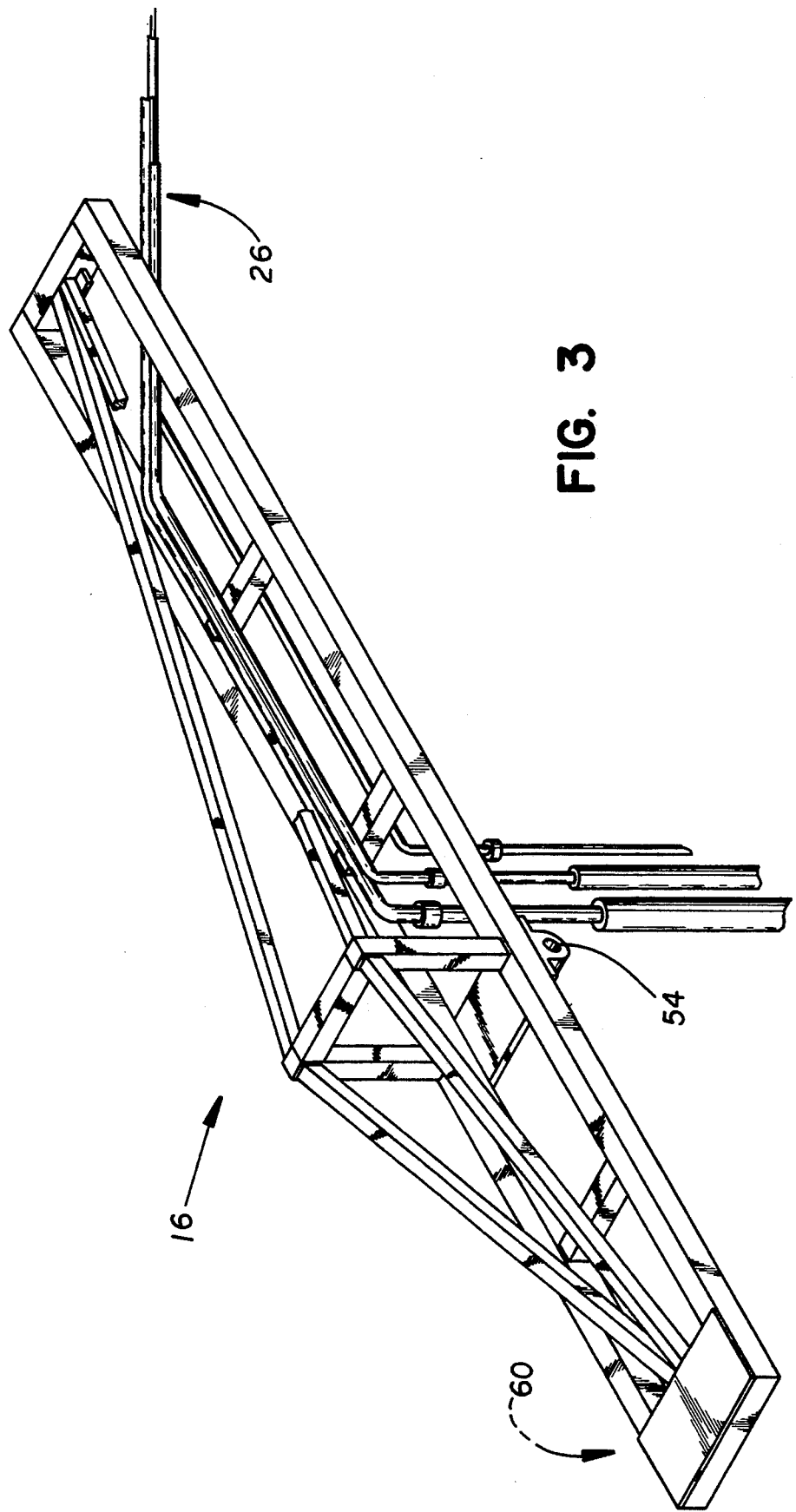
FIG. 3 is a perspective detail view of the boom arm of the spray apparatus.

FIG. 3 shows details of boom 16, including liquid and signal lines 26 and pivot point 54. Counterweight 60 is provided to balance the mass of nozzle assemblies 18A, 18B, 18C (see FIG. 1) with respect to pivot point 54, thus facilitating pivoting boom 16 for raising and lowering.

Figure 4:
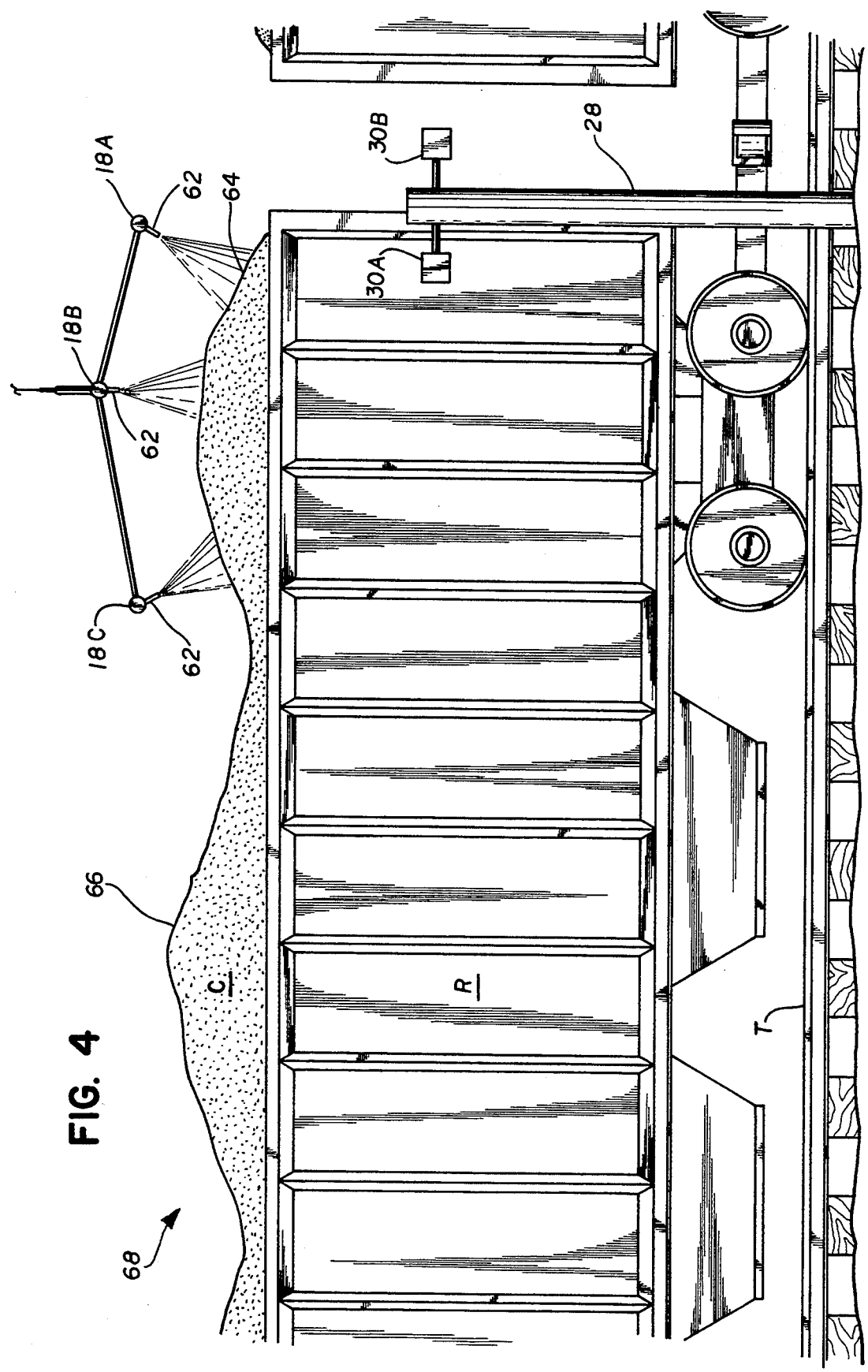
FIG. 4 is an environmental, side elevational view of a railroad car passing the spray nozzles and the electric eyes.
Figure 5:
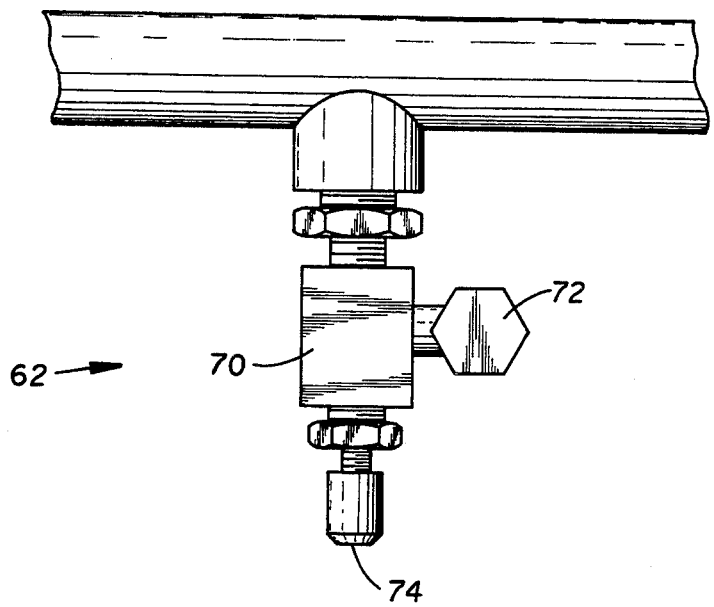
FIG. 5 is a side elevational detail view of a spray nozzle assembly.
Figure 6:
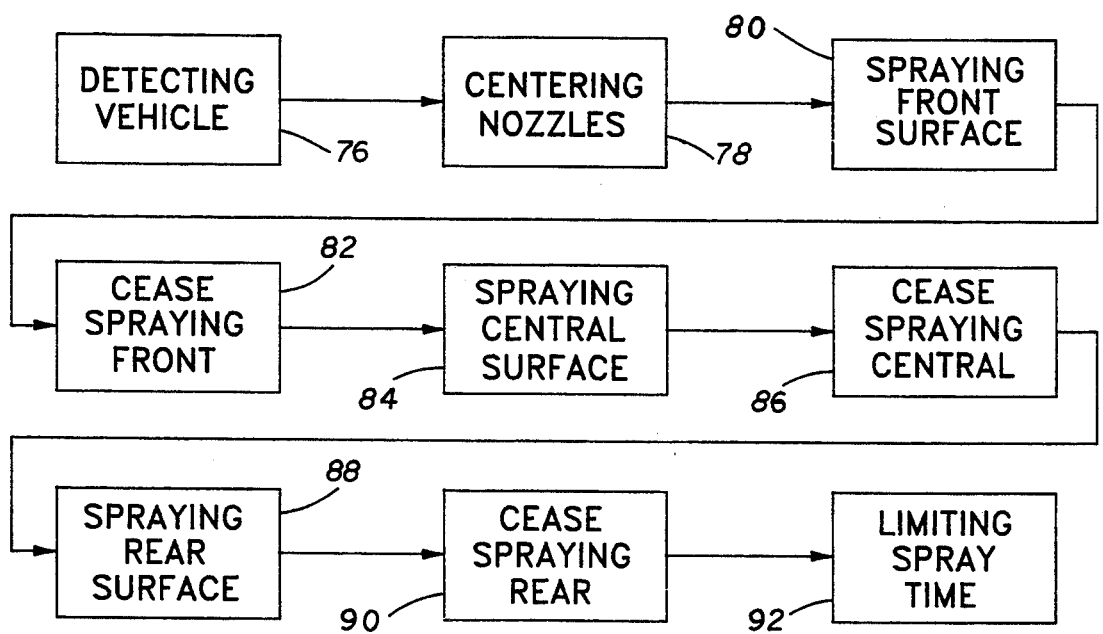
FIG. 6 is a diagram of steps of a method of spraying railway cars, employing the novel spray apparatus.

As seen in FIG. 4, three nozzle assemblies 18A, 18B, 18C are provided. Individual nozzles 62 of each nozzle assembly 18A, 18B, or 18C are directed in a direction different from that of nozzles 62 of other nozzle assemblies. Nozzle assembly 18A is inclined to the rear of a passing coal car R, so as to discharge its spray in a direction substantially normal to the inclined forward face 64 of heaped coal C. Nozzle 18B is arranged to spray downwardly, its respective spray thus impinging normal to the central, upwardly exposed surface 66 of the main body of the heaped coal C. Nozzle 18C is inclined to the front of coal car R, thus discharging spray in a direction normal to inclined rearward face 68 of heaped coal C.

Spray from nozzle assemblies 18A, 18B, and 18C are shown occurring simultaneously in the view of FIG. 4 solely to illustrate spray direction of the respective nozzles 62. In practice, generally only one nozzle assembly 18A, 18B, or 18C will be operating at any one time, except for incidental overlap in operation scheduling.

Spray operation is responsive to signals initiated by operation of photoresponsive receptors 30A and 30B, and as conditioned by timers (not shown). As illustrated in FIG. 4, receptors 30A and 30B are located spaced apart horizontally, so that a passing coal car R will break beams 38, 38 (see FIG. 1) sequentially. Sequence of spray operation is determined in part by signals generated responsive to which receptor 30A or 30B is experiencing interruption of its respective beam 38.

When neither beam 38 is interrupted, no spray operation is active. When beam 38 to receptor 30A is interrupted by a coal car R moving left to right, as illustrated in FIG. 4, nozzle assembly 18A is activated by an appropriate control signal. A control signal discontinuing operation of nozzle assembly 18A is governed by a timer (not shown). This timer maintains operation of nozzle assembly 18A for a predetermined time interval following detection of the presence of coal car R, then stops operation.

When both beams 38 and 38 are interrupted, nozzle assembly 18B is activated by an appropriate control signal. The same condition activates a timer (not shown) which generates a delayed control signal activating nozzle assembly 18C.

When coal car R passes, beams 38 and 38 are restored, and all spraying operations are discontinued. Still another timer (not shown) stops all spraying after a predetermined time interval greater than a normal total elapsed time interval for spraying an entire coal car R. This is a safety feature preventing excessive spraying in the event that the train (not shown in its entirety) stops, or that a photoreceptor 30A or 308 becomes inoperative.

The timers described hereinabove include electrical, pneumatic, and other timing devices well known in the field of controls, and will not be described in detail.

Turning now to FIG. 5, a typical individual nozzle 62 and associated valve 70 and valve operating device 72 are shown in detail. Nozzles 62 are valved individually in order to shut off flow at a point close to the discharge orifice 74 of nozzle 62. This arrangement prevents dribbling and reduction of discharge pressure at orifice 74 when starting the next spraying operation. Valve operating device 72 is an electrical solenoid, a pneumatic servo, or any transducer operating valve from a signal carried by one member of conduits 26 (see FIG. 1).

The novel spray apparatus 10 is thus employed to treat each car of a coal train as it departs a coal mine (not shown). Spray is directed and controlled so as to assure sufficient saturation of coal carried by each coal car, and also to avoid wasteful or environmentally objectionable overspray. Careful attention to repetitive operations is automatically provided, thus freeing human operators to assume a supervisory role.

It would be possible to govern certain events in the sequences described above by timer rather than by photocell control. In the same vein, it would be possible to employ one or more master timers to control plural nozzle assemblies, as opposed to furnishing an individual timer for each step in the sequence.

The steps 76, 78, 80, 82, 84, 86, 88, 90, and 92 involved in spraying each coal car R with the novel spray apparatus 10 are summarized in FIG. 6. First, presence of a coal car is detected. Then, nozzle assemblies 18A, 18B, 18C are centered over the first car. Next, spraying of the forward, or front, inclined face of the heaped coal is initiated. This phase of spraying is then discontinued.

The next four steps are, respectively, initiating and ceasing spraying of the central, upwardly exposed surface of the main body of heaped coat, and initiating and ceasing spraying of the rear, inclined face of heaped coal.

A final step of limiting total spray time as described above is provided to prevent excessive spraying.

Of course, the precise sequence of steps as described above is not necessarily required. For example, the step of centering spray nozzles may be performed prior to detecting proximity of a coal car. Also, scheduling of spraying operations can overlap, as previously mentioned, or otherwise be reordered.

It is to be understood that the present invention is not limited to the embodiments described above, but encompasses any and all embodiments within the scope of the following claims.

I claim:

1. A spray apparatus for surface encapsulation spraying of railway coal cars carrying heaped coal, comprising:

a spraying tower further comprising a vertical column having a longitudinal axis and a boom, said vertical column including means enabling rotation and vertical movement of said column about said longitudinal axis, and means for pivotally supporting said boom thereon, said boom supporting a plurality of series of spray nozzles, each said series having predetermined orientation with respect to said vertical column, there being a first series of said spray nozzles wherein the spray is directed forwardly on said heaped coal, a second series of said spray nozzles wherein the spray is directed backwardly on said heaped coal, and a third series of said spray nozzles wherein the spray is directed downwardly on said heaped coal, and vertical movement of said column and pivoted movement of said boom being controlled to maintain said orientation at a constant horizontal distance from said column's longitudinal axis, whereby uniform encapsulation of the surface of the heaped coal is effects to prevent moisture from evaporating from said heaped coal as said railway cars move along a railroad at traveling speed.

2. The spray apparatus according to claim 1, wherein said means enabling vertical movement of said column about said longitudinal axis further including powered means to raise and lower said column, and said means for pivotally supporting said boom further including powered means for pivoting said boom.

3. The spray apparatus according to claim 1, wherein said vertical column consists of inner and outer concentric members which are concentrically spaced apart by a dimension up to 0.40 inch.

4. The spray apparatus according to claim 3, wherein said concentric spacing dimension is within a range of 0.010 inch to 0.018 inch.

5. The spray apparatus according to claim 1, further including at least one photoresponsive signal generating means for generating at least one initiating signal responsive to detection of proximity of a railway coal car to said spraying tower, signal conditioning means producing at least one control signal responsive to said at least one initiating signal, said at least one control signal selectively determining start time and cessation time of spraying operations, and valve means controlling said spray nozzles, said valve means being responsive to said at least one control signal, whereby spray from said spray nozzles is selectively scheduled according to said signal generating means and said signal conditioning means.

6. The spray apparatus according to claim 5, wherein said at least one photoresponsive signal generating means including two photoresponsive sending units generating two beams to, respectively, two receptors, said two receptors being spaced apart horizontally, said at least one photoresponsive signal generating means generating a first signal responsive to detection of the front of a railway coal car approaching and passing by said spraying tower, and a second signal responsive to detection of a railway coal car passing by and departing from said spraying tower, and said at least one photoresponsive signal generating means generates spray nozzle control signals responsive to sequential interruption of said two beams.

7. The spray apparatus according to claim 6, wherein said control signal comprises first, second and third control signals, said valve means comprises first valve means controlling said first series of spray nozzles, second valve means controlling said second series of spray nozzles and third valve means controlling said third series of spray nozzles, said valve means being responsive to, respectively, said first, second and third control signals, whereby said first, second and third series of spray nozzles are independently controlled.

8. The spray apparatus according to claim 7, said valve means further comprising one valve responsive to one of said first, second and third control signals.

9. A spray apparatus for surface encapsulation spraying of railway coal cars carrying heaped coal, comprising:

a spraying tower further having a vertical column having a longitudinal axis and a boom, said vertical column being made up of inner and outer concentric members which are concentrically spaced apart by a dimension up to 0.40 inch, said vertical column including means enabling rotation and vertical movement of said column about said longitudinal axis, said means enabling vertical movement of said column about said longitudinal axis further including powered means to raise and lower said column, and means for pivotally supporting said boom, further including powered means for pivoting said boom;

said boom supporting three series of spray nozzles, each said series having predetermined orientation with respect to said vertical column, there being a first series of said spray nozzles wherein the spray is directed forwardly on said heaped coal, a second series of said spray nozzles wherein the spray is directed backwardly on said heaped coal and a third series of said spray nozzles wherein the spray is directed downwardly on said heaped coal, wherein vertical movement of said column and pivoted movement of said boom being controlled to maintain said orientation at a constant horizontal distance from said column's longitudinal axis;

photoresponsive signal means comprising two photoresponsive sending units generating two beams to, respectively, two receptors, said two receptors being spaced apart horizontally, said at least one photoresponsive signal generating means generating a first signal responsive to detection of the front of a railway coal car carrying heaped coal approaching and passing by said spraying tower, and a second signal responsive to detection of a railway coal car carrying heaped coal passing by and departing from said spraying tower, and said at least one photoresponsive signal generating means generates spray nozzle control signals responsive to sequential interruption of said two beams, said photoresponsive signal means generating at least one initiating signal responsive to detection of proximity of a railway coal car carrying heaped coal to said spraying tower;

valve means controlling said nozzles, there being first valve means for controlling said first series of nozzles, second valve means for controlling said second series of nozzles and third valve means for controlling said third series of nozzles; and signal conditioning means producing first, second and third control signals controlling, respectively, said first, second and third valve means, whereby said first, second and third series of spray nozzles are independent controlled, thus causing spray from said spray nozzles to be selectively scheduled according to said signal generating means and said signal conditioning means.

10. A method of surface encapsulation spraying of railway coal cars carrying heaped coal on departing a coal mine, comprising the steps of:

detecting approach and proximity of a railway coal car carrying heaped coal to a spray apparatus having first, second and third series of spray nozzles;

causing the first series of nozzles to spray a frontal, inclined surface of the heaped coal, the spray being directed such that it includes backward and downward components of direction;

causing the second series of nozzles to spray an upwardly exposed, central surface of the heaped coal, the spray being directed downwardly; and causing the third series of nozzles to spray a rear, inclined surface of the heaped coal, the spray being directed such that it includes forward and downward components of direction, wherein said spraying uniformly penetrates the top six inches of the heaped coal surface and prevents evaporation of liquids trapped in the coal heap and, consequently, prevents dusting during further transportation of said railway coal cars moving at traveling speed.

11. The method of claim 10, further comprising, after the step of causing the first series of nozzles to spray, an additional step of:

causing the first series of nozzles to cease spraying after elapse of a predetermined time delay;

after the step of causing the second series of nozzles to spray, an additional step of:

causing the second series of nozzles to cease spraying after elapse of a predetermined time delay; and, after the step of causing the third series of nozzles to spray, an additional step of:

causing the third series of nozzles to cease spraying after elapse of a predetermined time delay.

12. The method of claim 10, further comprising the step of:

limiting spray time to a predetermined time interval exceeding the longest individual normal spray time interval.

13. The method of claim 10, further comprising the step of: centering the nozzles over the coal car carrying heaped coal.

14. The method of claim 10, wherein the step of detecting approach and proximity of a coal car carrying heaped coal comprises photoresponsive detection of said coal car.

* * * * *